Feb. 28, 1956  R. H. SAVAGE  2,736,830
CURRENT-CONVEYING BRUSHES
Filed July 25, 1951
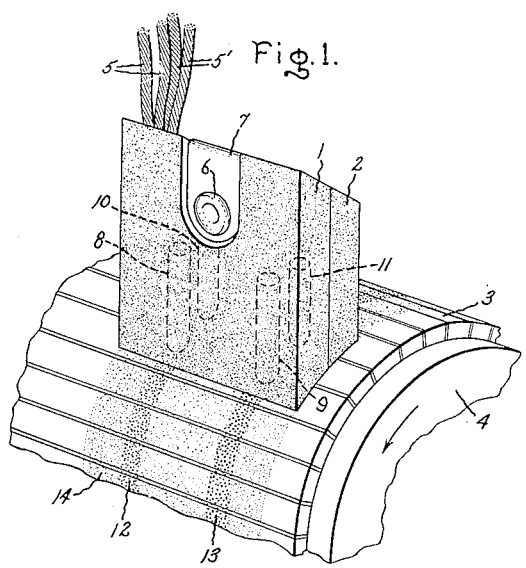
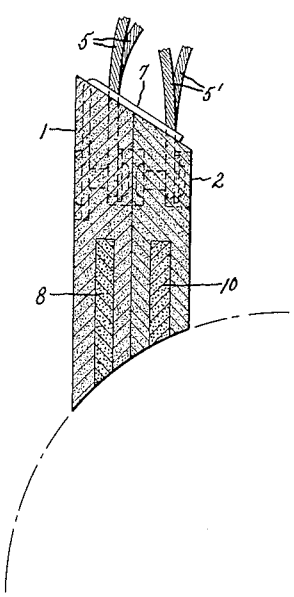
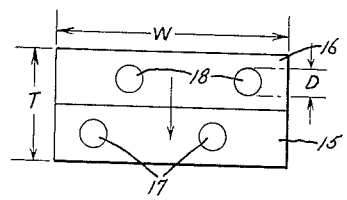
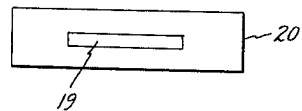
Inventor:
Robert H. Savage,
by Paul A. Frank
His Attorney.

United States Patent Office 2,736,830
Patented Feb. 28, 1956

2,736,830

CURRENT-CONVEYING BRUSHES

Robert H. Savage, Scotia, N. Y., assignor to General Electric Company, a corporation of New York Application July 25, 1951, Serial No. 238,472

13 Claims. (Cl. 310—228)

The present invention relates to the commutation and collection of current in rotating electric devices, such as motors and generators, and provides improved contact-making brushes which are capable of efficient operation when functioning as current collectors or distributors under conditions heretofore accompanied by excessive wear and short life. As a consequence of my invention brushes have been provided which are adapted for long continued operations at high altitudes, or in regions of extreme dryness at low altitudes, or under the low humidity atmospheric conditions of extremely low climatic temperatures.

Contact-making brushes for collecting or delivering electric current heretofore have been constituted predominantly of carbon or graphite. Experience has demonstrated that ordinary carbonaceous brushes rapidly fail due to excessive wear when operating under the conditions of high altitude, where the humidity is extremely low. Rapid wear of carbon brushes also occurs under other conditions of extremely low humidity, such as encountered at subzero temperatures at low altitudes. Excessive brush wear has constituted a problem of growing gravity as developments of aircraft increasingly entailed operations at high altitudes and at high speeds which enhanced brush wear.

In some cases, the pores or interstices of carbon or graphite brushes have been impregnated or "treated" with so-called film-forming compounds or have had such compounds incorporated within their structure during their manufacture. Brushes containing various impregnants or additives when operated under the adverse atmospheric conditions have been subject to less intensity of wear, but even the best of the impregnated or treated brushes operated with impaired efficiency when compared with a standard carbon or graphitic brush operating in the presence of an adequate vapor pressure. Some of the difficulties were caused by over-filming by reason of the deposition of the lubricating material or additive as a smear on the rubbing surface of the commutator or other current-transferring device. This deleterious effect may be further intensified by spasmodic local evaporation and condensation at restricted areas of intense heating. As a consequence, excessive contact resistance occurred, accompanied by sparking, commutator roughening, accelerated wear and overheating of the apparatus.

Efforts extending over many years have been made to overcome excessive wear of electric brushes. The decreased rate of wear and disintegration of carbon brushes under low altitude conditions when in sliding contact with rapidly moving metal surfaces appears to be due to a lubricating film or track which is formed as the result of an adsorption in which aqueous vapor in the atmosphere played an important role. Attempts have been made to solve the problem by incorporating sulfur compounds into dynamo-electric brushes. It was also attempted to utilize a sulfur compound of a metal as an auxiliary collector at a region removed from the current-conducting carbon brushes. However, under ordinary atmospheric conditions, deposition of the lubricant on the commutator or ring was excessive when the rate of supply of the lubricant was proportioned to be sufficient to cause the brush to function properly at high altitudes. Automatic regulation of the supply of lubricant in accordance with varying atmospheric requirement was not achieved, nor could the lubricating material be supplied by an independent source at the required variable rates.

In accordance with my present invention, such difficulties have been overcome by a brush construction which provides multiple brush-engaging surfaces consisting of different materials. One of these materials is adapted for low altitude and another for high altitude or other non-lubricating conditions. Such brushes are constructed with members respectively adapted for high and low humidity conditions which are axially so aligned as to cause the member of the brush adapted for efficient operation under given conditions automatically to assume current-collecting function and to form a film having good bearing quality thus avoiding excessive wear of a companion brush member which is not adapted for operation under such conditions.

In a preferred embodiment of my invention dynamo-electric brushes, which may consist of unimpregnated graphitic carbon or mixtures of carbon and a metallic component, such as copper and silver, are provided with recesses or cavities, extending away from the contact-engaging surface of the brush and such recesses are charged with a special non-carbonaceous solid commutating material chosen as hereinafter specified, which is adapted to engage the moving surface of a current transfer device under conditions of low humidity and low atmospheric pressures without either excessive wear or overfilming.

The term "graphitic carbon" as used herein is a generic term intended to mean elemental carbon which shows an X-ray diffraction pattern which includes the lines characteristic of a graphite lattice and also includes graphite. Graphitic carbon brushes operate efficiently as current-collectors under ordinary low altitude conditions of atmospheric pressure and humidity. The inserted material comprises a compound containing an element having chemical affinity for carbon, such, for example, as oxygen, sulfur, a halogen, nitrogen, or phosphorus. Such materials ordinarily are introduced as a compound of a metal and the chosen element which is reactive chemically to carbon, for example, as a sulfide, a halide, an oxide, or as a salt of a metal. Molybdenum disulfide is a preferred example of such material. Among the sulfides, particular attention is called, in addition, to cadmium sulfide, lead sulfide, and silver sulfide. Among the halides, cadmium iodide and calcium fluoride are examples. Various oxides, in particular, zinc oxide, lead oxide, and magnesium oxide, are suitable as lubricating adjuvants. Molybdenum disulfide in comparison with other suitable materials possesses the advantages of relatively high electrical conductivity, substantial immunity from shrinkage upon firing and low cohesive strength between planar layers of its crystals. In general, brush inserts embodying my invention provide in combination with graphite, even in the absence of all gases and vapors, a film of high lubricity on which the engaging face of the brush will ride without excessive wear.

My invention will be described in connection with the accompanying drawing in which Fig. 1 is a conventionalized drawing of a segmental part of a commutator and brushes, the auxiliary brush material being present as plugs which are indicated in dotted outline; Fig. 2 is a longitudinal sectional view of a brush; Fig. 3 is a diagrammatic representation of a modification and also illustrates space relations between the main body of the brush and the auxiliary materials; and Fig. 4 is a representation of a modification.

The drawing shows carbon brushes 1, 2 operating in juxtaposed relation, each bearing against the conductive segments 3 of a commutator 4. Each brush has stranded pigtail conductors 5, 5' connected thereto in any approved manner, for example, by riveting as indicated at 6. The rivet also serves to attach a bent metallic strip or plate 7 whereby the brushes are held in a brush holder (not shown). Each brush is provided with a plurality of holes or cavities in which the auxiliary brush material is contained as plugs. In the drawing, two plugs are shown in each brush, but a greater number or a single cavity (usually of larger size) may be provided, as indicated in Fig. 4. The plugs 8, 9 extend from the contacting end of carbon brush 1 upward into the brush toward the opposite end where the pigtail connection is made. Similarly the plugs 10, 11 of brush 2 extend longitudinally away from the contacting end of brush 2 toward the pigtail connection thereof. In all cases the auxiliary adjuvant material is exposed at the engaging surface of the brush across only a portion of the lateral extent of the brush. When under conditions of low humidity the inserts 8, 9, 10, and 11 assume commutation due to the wearing away of the carbon which causes the inserts to project somewhat, then the filming characteristics of the inserts come into play as indicated by the darker tracks 12, 13 within the broader track 14 of the carbon portion of the brush.

In the manufacture of the brushes, a compound of the character above indicated is introduced into the cavities in any suitable manner as by tamping the desired material as a powder or as granules into the cavities to form solid plugs, or the plugs may be preformed and introduced into cavities proportioned to receive them. Preferably, but not necessarily in all cases, the sulfide, halide, oxide or other equivalent compound is admixed with a comminuted metal of good conductivity such, for example, as comminuted silver or copper. The filling thus introduced and compacted by tamping, is further consolidated by firing, preferably in a protective atmosphere from which oxygen is excluded. Molybdenum disulfide shrinks very little during firing, but the associated silver or other metal sinters so as to improve the cohesion and conductivity of the mass. Preferably a mixture of molybdenum disulfide, $MoS_2$, and silver is used for making a composite brush constructed in accordance with my invention. As molybdenum disulfide is a fair electrical conductor, association with silver, copper, or other metal is not always required. Ordinarily the proportion of good conductive metal to the chosen compound should be within the limits of about 1 to 50%. Proportions of associated metal as high as about 75% may be used, but ordinarily the upper limit should be about 50%. The preferred range of the metal content is about 5 to 10% when the associated material is molybdenum disulfide.

In a brush having a total thickness of about 0.5 inch in the circumferential direction of the commutator, the diameter of plugs arranged as shown in Figs. 1 and 2 may be about 15 to 25% of such thickness.

In Fig. 3 is indicated the preferred geometric relations of the cross-section of a brush containing lubricating inserts or plugs. The two rectangular areas 15, 16 of Fig. 3 represent cross-sections of a brush. The pairs of inserts 17 and 18 are located out of line with one another in the direction of travel of the brushes as indicated by the arrow, thereby differing from the tandem arrangement of Figs. 1 and 2. Irrespective of this modification, the following general relations are noted. The total thickness of the brushes in the direction of travel is indicated by T. The breadth of each insert is indicated as D. Ordinarily, for staggered plugs, the ratio of D/T should be about 1/5. In the case of plugs which are to some extent in tandem with one another, the diameter D is increased in proportion to the effective sum of the plug-breadths in a circumferential direction. The width of the brushes at right angles to the direction of travel is indicated as W. The optimum ratio of the product of the breadth D of the plugs and their number N to the width W of the body of a brush embodying my invention depends on operating requirements to a considerable extent, for example, the relation of duration of operation at low altitude to duration of operation at high altitude. Under average conditions the ratio of $N \times D/W$ should be about 1/2. This also is true of the single insert 19 in a brush 20 shown in Fig. 4. In other words, the width of the track of the auxiliary contact material of a brush made in accordance with my invention should be under conditions of average severity about 50% of the total width of the track of the brush as a whole, but in any case the exposed bearing surface of the insert, or inserts, should extend over a portion only of the lateral extent of the brush-engaging surface.

Under ordinary low altitude conditions of humidity and atmospheric pressures, the contact-making role of the brush is assumed by the graphitic carbon. The inserted plugs of non-carbonaceous material wear away as fast or even faster than the carbonaceous part and, hence, do not interfere with the normal functioning of the brush. And tendency to overfilm under these conditions would be confined to a fractional part of the track width as indicated in the drawing by heavier stipple than the track of the brushes as a whole. At high altitudes, say at 30,000 to 60,000 feet elevation or higher, the carbon body of the brush ordinarily would wear or "dust" away rapidly. However, when wear of the carbon component exceeds wear of the plus, the brush begins to ride upon the circumferential sections containing the plugs. As shown in the drawing, the plugs 8 and 10 and the adjoining plugs 9 and 11 in the two respective brushes 1, 2 are in line with one another and form narrow tracks on the commutator segments. These tracks have good bearing qualities and maintain good contacting relations with the respective brushes, thus preventing by their good commutation undesired fast erosion of the carbon bodies of the brushes. On the other hand, the plug material cannot build up too high on the brush as the main carbonaceous part of the brush and the plugs are unitary structures and, hence, must wear in fixed proportion. As a consequence, automatic regulation of the roles of the respective brush parts under different conditions of humidity is achieved in brushes made in accordance with the present invention.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. An electric contact-making brush comprising the combination of a main body consisting at least in part of carbonaceous material and one or more non-carbonaceous auxiliary inserts having current-carrying and filming properties forming part of said brush and being arranged to be exposed at the engaging surface thereof across only a portion of the lateral extent of said surface, said inserts including a component having chemical affinity for carbon.

2. A brush for dynamo-electric machine contact-making function comprising the combination of a graphitic carbon body portion having a longitudinal cavity in the commutating end of said brush being spaced away from the marginal portion of said commutating surface, and non-carbonaceous auxiliary commutating material in said cavity, said material consisting of a mixture including a solid compound having chemical affinity for carbon and a solid metal dispersed therein.

3. An electric current-carrying brush comprising the combination of a main member of graphitic carbon and one or more non-carbonaceous auxiliary members consolidated into said brush structure to be exposed across only a portion of the lateral engaging surface of the contact-making terminal thereof, said members consisting at least in part of a sulfur compound.

4. A dynamo-electric machine brush comprising the combination of a main body portion comprising carbon which has one or more cavities extending from the contact end of said brush toward the opposite end, and non-carbonaceous electrically conducting solid material therein, said material comprising preponderantly in chemical combination a metal and an element having chemical affinity for carbon.

5. A current-carrying brush which contacts with moving surfaces during use comprising the combination of a body portion comprising carbon and having one or more recesses extending from the contacting end toward the opposite end of said brush, and a non-carbonaceous mixture comprising a major component of sulfide of a metal and a minor component of a material of higher electric conductivity than said sulfide contained in said recess or recesses.

6. A current-carrying brush which contacts with moving surfaces during use comprising the combination of a body portion consisting of graphitic carbon and having one or more cavities extending from the contacting end toward the opposite end of said brush, and a composition of molybdenum disulfide and silver contained in said cavities, the molybdenum disulfide being a major component of said composition.

7. An electric contact-making brush comprising the combination of a main member comprising in part at least carbonaceous material which is provided with one or more cavities, and a non-carbonaceous current-conducting composition contained in said cavities and being exposed at the contact-making terminal of said brush, said composition comprising in admixture a major component constituted of a compound of an element having chemical affinity for carbon and a minor component of a metal chosen from the group consisting of silver and copper.

8. An electric contact-making brush comprising the unitary combination of a main body of graphitic carbon and one or more auxiliary members extending across a portion only of the lateral extent of the contacting surface of said brushes, said members consisting of a mixture of molybdenum disulfide and silver, the proportion of silver in said mixture being within the limits of about 1 to 50%, said body member and said auxiliary members being axially aligned to both partake of the contact-making function of said brush and pigtail electric conductors connected to said carbon member.

9. A brush for rubbing contact-making engagement with electric commutators and slip rings which comprises the combination of a main recessed body member of graphitic carbon, a pigtail connection for said main member and auxiliary contact-making material in the recessed body member and being exposed laterally over a portion only of the commutating surface of said brush to take part in the contact-making function of said brush, said material being constituted by weight of about 95 to 90 parts molybdenum sulfide and about 5 to 10 parts of silver.

10. A brush for rubbing contact-making engagement with rotating dynamo-electric machine members which comprises the combination of a main body of carbon containing one or more longitudinal recesses, pigtail electrical connection for said body and non-carbonaceous auxiliary contact-making composition contained in said recesses and being exposed at the contacting end of said brush to take part in the current-conveying function thereof, the width of track of said auxiliary material of said brush being about 50% of the total width of track of said brush, said composition consisting of a mixture of metal and a compound, one element of which is chemically reactive with carbon.

11. A brush for rubbing contact-making engagement with rotating dynamo-electric machine members which comprises the combination of a main body of carbon containing one or more longitudinal recesses, pigtail electric connection for said body and auxiliary composition contained in said recesses and being exposed at the contacting end of said brush to take part in the current-conveying function thereof, said composition being capable in combination with carbon of forming a film of high lubricity on a rotating contact-making member with which said brush engages, the width of track of said auxiliary material in the direction of engagement of said brush being about 50% of the total width of track of said brush, said composition consisting of a consolidated mixture of about 90 to 95% by weight of molybdenum sulfide and about 10 to 5% by weight of silver.

12. An electric contact-making brush comprising the combination of a main body consisting at least in part of carbonaceous material and at least one non-carbonaceous auxiliary insert having current-carrying and film forming properties forming part of said brush and being arranged to be exposed at the engaging surface thereof across only a portion of the lateral extent of this surface, said insert including a major portion of a component selected from the class consisting of a metal sulfide, a metal halide, and a metal oxide.

13. An electric contact-making brush comprising the combination of a main body consisting at least in part of carbonaceous material and at least one non-carbonaceous auxiliary insert having current-carrying and film forming properties forming part of said brush and being arranged to be exposed at the engaging surface thereof across only a portion of the lateral extent of this surface, said insert consisting of a major portion of a component selected from the class consisting of a metal sulfide, a metal halide, and a metal oxide and a minor portion of a component consisting of a metal.

References Cited in the file of this patent

UNITED STATES PATENTS

| | | |
|---|---|---|
| 427,674 | Daft | May 13, 1890 |
| 677,071 | Eddy | June 25, 1901 |
| 1,887,559 | Marcellus | Nov. 15, 1932 |
| 2,414,514 | Elsey | Jan. 21, 1947 |
| 2,428,036 | Peters et al. | Sept. 30, 1947 |
| 2,445,003 | Ramadanoff | July 13, 1948 |
| 2,462,055 | Herwig | Feb. 22, 1949 |
| 2,465,051 | Adams et al. | Mar. 22, 1949 |

FOREIGN PATENTS

| | | |
|---|---|---|
| 14,373 | Switzerland | May 5, 1897 |
| 27,621 | Great Britain | of 1911 |
| 594,536 | France | Sept. 14, 1925 |